(12) United States Patent
Nilson

(10) Patent No.: US 10,099,783 B1
(45) Date of Patent: Oct. 16, 2018

(54) ACCESSORY MOUNTING FOR ROTARY WING AIRCRAFT

(71) Applicant: FPV Manuals LLC, Sarasota, FL (US)

(72) Inventor: Tim Nilson, Sarasota, FL (US)

(73) Assignee: FPV MANUALS LLC, Sarasota, FL (US)

( * ) Notice: Subject to any disclaimer, the term of this patent is extended or adjusted under 35 U.S.C. 154(b) by 225 days.

(21) Appl. No.: 14/822,480

(22) Filed: Aug. 10, 2015

Related U.S. Application Data

(60) Provisional application No. 62/036,063, filed on Aug. 11, 2014.

(51) Int. Cl.
  *B64C 39/02* (2006.01)
  *B64D 43/00* (2006.01)

(52) U.S. Cl.
  CPC ............ *B64C 39/024* (2013.01); *B64D 43/00* (2013.01); *B64C 2201/00* (2013.01)

(58) Field of Classification Search
  CPC ........ B64D 27/26; B64D 27/08; A63H 27/12; B64C 39/00; B64C 29/00; B64C 5/06; B64C 27/22; B64C 2201/108; B64C 2201/042; B64C 2201/162; B64C 1/062
  See application file for complete search history.

(56) References Cited

U.S. PATENT DOCUMENTS

| | | |
|---|---|---|
| 1,531,593 A | 3/1925 | Brinsmade |
| 2,826,974 A | 3/1958 | Huber |
| 3,002,712 A * | 10/1961 | Beckwith ............... B64C 27/20 244/17.23 |
| 3,689,012 A | 9/1972 | Liston |
| 5,531,403 A * | 7/1996 | Tyler ..................... B64D 47/08 244/118.1 |
| 6,293,676 B1 | 9/2001 | Holway |
| 6,616,097 B2 * | 9/2003 | Hilbert ..................... B64C 1/20 244/118.1 |
| 8,016,494 B2 | 9/2011 | Holway |
| 8,179,078 B2 | 5/2012 | Sidman |
| D680,151 S | 4/2013 | Katori |
| 8,424,950 B2 | 5/2013 | Wawro |
| 8,453,962 B2 * | 6/2013 | Shaw ..................... B64C 27/20 244/12.4 |
| 8,874,283 B1 * | 10/2014 | Cavote .................. B64D 47/08 701/11 |

(Continued)

FOREIGN PATENT DOCUMENTS

FR    2995875 A1 *  3/2014  ........... B64C 39/024
JP    2010283610 A    12/2010

*Primary Examiner* — Assres H Woldemaryam
(74) *Attorney, Agent, or Firm* — Frijouf, Rust & Pyle P.A.

(57) ABSTRACT

An improved accessory mounting is disclosed for a rotary wing aircraft comprising a frame supporting a plurality of driven propellers. A transceiver is connected to a electronic flight control for directing the flight of the rotary wing aircraft. An accessory frame receives an accessory load to be carried by the rotary wing aircraft. A battery is disposed on the frame for powering the transceiver. A quick change mounting removably mounts the accessory frame to the frame. Preferably, the battery is movable relative to the frame for compensating for different weights of the accessory load secured to the accessory frame to adjust the center of mass for proper flight of the rotary wing aircraft. An integral balance included for adjusting the center of mass assisting of the rotary wing aircraft.

9 Claims, 11 Drawing Sheets

(56) References Cited

U.S. PATENT DOCUMENTS

| | | | | |
|---|---|---|---|---|
| 8,931,730 | B2* | 1/2015 | Wang | B64C 39/028 244/100 R |
| 9,061,763 | B1* | 6/2015 | Christensen | A63H 17/28 |
| 9,139,310 | B1* | 9/2015 | Wang | B64F 1/36 |
| 9,280,038 | B1* | 3/2016 | Pan | G03B 17/561 |
| 9,527,588 | B1* | 12/2016 | Rollefstad | B64C 39/024 |
| 2002/0104921 | A1* | 8/2002 | Louvel | A63H 27/04 244/12.1 |
| 2008/0048065 | A1* | 2/2008 | Kuntz | A63H 17/00 244/17.23 |
| 2012/0056041 | A1* | 3/2012 | Rhee | B64C 25/32 244/4 R |
| 2012/0083945 | A1* | 4/2012 | Oakley | B64C 27/08 701/2 |
| 2014/0034775 | A1* | 2/2014 | Hutson | B64C 39/024 244/17.17 |
| 2014/0034776 | A1* | 2/2014 | Hutson | B64D 45/00 244/17.17 |
| 2014/0117149 | A1* | 5/2014 | Zhou | A63H 27/12 244/17.23 |
| 2014/0131510 | A1* | 5/2014 | Wang | B64C 39/024 244/17.23 |
| 2014/0158816 | A1* | 6/2014 | DeLorean | B64C 29/0033 244/12.4 |
| 2014/0231582 | A1* | 8/2014 | Headrick | B64C 27/08 244/54 |
| 2015/0097950 | A1* | 4/2015 | Wang | H04N 5/23287 348/144 |
| 2015/0336670 | A1* | 11/2015 | Zhang | B64C 1/00 244/119 |
| 2016/0122016 | A1* | 5/2016 | Mintchev | B64C 39/024 244/17.23 |
| 2016/0194089 | A1* | 7/2016 | Zondervan | B64C 15/02 701/5 |

* cited by examiner

ACCESSORY MOUNTING FOR ROTARY WING AIRCRAFT

CROSS-REFERENCE TO RELATED APPLICATIONS

This application claims benefit of U.S. Patent Provisional application No. 62/036,063 filed 11 Aug. 2014. All subject matter set forth in provisional application No. 62/036,063 filed 11 Aug. 2014 is hereby incorporated by reference into the present application as if fully set forth herein.

BACKGROUND OF THE INVENTION

Field of the Invention

This invention relates to aircraft and more specifically to an improved accessory mounting for a rotary wing aircraft for enabling quick change of accessory loads.

Description of the Related Art

Many unmanned aircraft are provided with an accessory for sensing or observing the area around the unmanned aircraft. Typically, an unmanned aircraft includes a flight camera for relaying information regarding the flight direction and flight characteristics to a remote operator. In addition, the unmanned aircraft may be provided with other sensors or video cameras supplementing the flight.

In many instances, it is desirable to mount a camera on a gimbal for eliminating the flight attitude and/or direction from the output from the gimbal camera. In addition, many other sensors may be applied to the unmanned aircraft for sensing the environment in remote places unavailable for conventional sensing.

The following prior art illustrate attempts of the prior art to provide a mounting for enabling quick change of accessory loads.

U.S. Pat. No. 1,531,593 to Brinsmade discloses a mounting for aerial cameras comprising a base, a sling into which the camera is adapted to be fitted and clamped, gimbal jointed members interposed between the base and sling, and shock absorbing elements between the base and corresponding gimbal jointed members.

U.S. Pat. No. 2,826,974 to Huber discloses an aircraft-instrument mount for supporting a gun sight and a camera upon the surface of an aircraft shroud. The invention comprises a sight, a camera, a mount embodying an attachment plate, a gun sight and a camera supporting bracket. A means is provided for attaching and aligning the mount to the airplane and a means for attaching the sight to the base portion of the bracket. The bracket comprises a sight and a camera-supporting structure extending upwardly from its base portion. The structure is provided with tabs which contact the sight when it is mounted upon the bracket. The tabs are provided with apertures through which bolts are arranged for securing the tabs to the sight; and a means arranged between the base member and the supporting bracket to provide the azimuth and elevation adjustment, as well as the locking system which-will maintain the gun sight in adjustment once the harmonization has been effected.

U.S. Pat. No. 3,689,012 to Liston discloses an aerial camera housing for mounting on the wingstrut of a high-wing aircraft having an aerodynamically shaped outer casing having one end open and is attached to an inner and outer bracket to permit mounting to the wingstrut. The outer bracket is attached to the housing by an adjustable suspension assembly for the purpose of providing proper camera alignment with the axis of the plane's flight. The camera is held in a similarly shaped inner casing having an outer diameter slightly less than the inner diameter of the outer casing so as to permit the inner casing to be slidably inserted into the outer casing to form the assembled aerial camera housing.

U.S. Pat. No. 5,531,403 to Tyler discloses an attachment frame for mounting camera equipment to an aircraft such as a helicopter. The frame is adapted to be readily detachably mounted to attachment points located adjacent the rear seat support within the rear passenger compartment. For added strength, the frame can also be mounted to the helicopter skid. The frame is adapted to rest upon the seat support and is elongated for projection through the compartment and out its opposite side for mounting a camera pod and an accessories package at its opposite extremities, respectively. The frame includes extensible elements such as turnbuckles which are pivotally mounted to the frame and to bearing pads adapted to rest against the rear bulkhead of the rear passenger compartment. Extension of the extension elements urges the frame against the seat support and urges the bearing pads against the rear bulkhead to snugly hold the frame in position.

U.S. Pat. No. 6,293,676 to Holway discloses an arrangement of telescoping posts, component positioning hardware, electrical wire retracting hardware, and optional hardware to augment rigidity for extended long-post operation of a Steadicam®-type camera stabilizer while retaining static and dynamic balance throughout the entire range of post sizes and various component weights, U.S. Pat. No. 8,016,494 to Holway, et al. discloses a folding, adjustable camera support having a central post secured in one or more central post holders. A first camera equipment support component having a distal end and a proximate end is adjustably attached at its proximate end to one of the one or more central post holders, and is configured to adjust between an operative position and a folded position via an adjustment mechanism. The distance of the camera equipment is adjustable radially from the central post. A second camera equipment support component is similarly configured and adjustable with respect to the central post, and can balance the first camera equipment component.

U.S. Pat. No. 8,179,078 to Sidman discloses a hand-held or vehicle-mounted stabilization system including a platform supported by two or more rotatably-coupled gimbal frames. Each frame has a pivot assembly disposed at its rotation axis to couple an actuator to a rotation sensor. The rotation sensor has a rotation-sensitive sensor axis that is preferably fixedly disposed with respect to the rotation axis. A controller is provided for accepting the sensor signals and for producing each motor signal needed to dispose the platform in a predetermined angular position with respect to each rotation axis independent of changes in mount orientation. An alternative embodiment includes a controller for accepting an external slew signal sequence and for producing the motor signals needed to move the platform along a predetermined sequence of positions represented by the slew signal sequence.

U.S. Pat. No. 8,434,950 to Wawro discloses an aerial photography mount that features a three-axis gimbal unit that is supported between two posts by elastic straps. Each of the axes rotates within precision bearings that enable smooth operation of a camera secured to the mount. The elastic straps, in conjunction with independently rotating bearings at the end suspension assemblies, provide a enhanced vibration isolation effect. The mount can be further stabilized by the attachment of gyroscopic stabilizers.

United States Patent Application 2012/0083945 to Oakley, et al. discloses an invention which relates to a helicopter having a modular airframe, with multiple layers, which can be connected easily. The layers house the electronics (autopilot and navigation systems), batteries, and payload (including camera system) of the helicopter. The helicopter has four, six, and eight rotors, which can be easily changed via removing one module of the airframe. In one embodiment, the airframe has a vertical stacked appearance, and in another embodiment, a domed shape (where several of the layers are stacked internally). In one embodiment, there is a combination landing gear and camera mount. The helicopter allows for simple flight and usage by remote control, and non-remote control, users.

U.S. Design Pat. No. D680,151 to Katori discloses an ornamental design for a network camera.

Although the aforementioned prior art have contributed to the development of the art of accessory mounting art none of these prior art patents have solved the needs of this art.

Therefore, it is an object of the present invention to provide an improved accessory mounting for a rotary wing aircraft that enables quick change of accessory loads.

Another object of this invention is to provide an improved accessory mounting for a rotary wing aircraft that accommodates for different wrights of the accessory loads Another object of this invention is to provide an improved apparatus that is simple for the operator to use.

Another object of this invention is to provide an improved apparatus that is easy to cost effectively produce.

Another object of the present invention is to provide an improved frame for a rotary wing aircraft which add mechanical strength with little or no additional weight.

Another object of the present invention is to provide an improved frame for a rotary wing aircraft which add mechanical strength and may be assembled with common tools.

Another object of this invention is to provide an improved apparatus that incorporates a balance for adjusting the center of mass to be in alignment with the center of effort of rotary wing aircraft.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved accessory mounting for a rotary wing aircraft comprising a frame supporting a plurality of driven propellers. An electronic flight control controls the plurality of driven propellers. A transceiver is connected to the electronic flight control for directing the flight of the rotary wing aircraft. An accessory frame provides a platform for receiving an accessory load to be carried by the rotary wing aircraft. A battery is disposed on the frame for powering the transceiver. A quick change mounting removably mounts the accessory frame to the frame.

In a more specific example of the invention, the accessory frame is mounted proximate a first end of the frame and the battery is disposed proximate a second end of the frame. The battery is movable relative to the second end of the frame for compensating for different weights of the accessory load secured to the accessory frame.

In another more specific example of the invention, the quick change mounting includes a first and a second mounting for removably securing the accessory frame to a frame lower element and a frame upper element of the frame. The first mounting includes a projection engaging with an aperture between the accessory frame and the frame lower element. The second mounting includes a tab engaging with a fastener between the accessory frame and the frame upper element.

In another embodiment, the invention is incorporated into a rotary wing aircraft having an integral balance. A frame extends between a first and a second end of the rotary wing aircraft. A plurality of driven propellers are connected to the frame. The plurality of driven propellers define a center of effort of the plurality of driven propellers. A component is slidably connected to the frame for adjusting a center of mass of the rotary wing aircraft. A connector is located in proximity to the center of effort of the rotary wing aircraft for suspending the rotary wing aircraft to adjust the center of mass of the rotary wing aircraft in accordance with the center of effort of the plurality of driven propellers.

In a more specific example of the invention, the connector comprises a first and second projection extending the frame on opposed sides of the center of effort of the rotary wing aircraft for suspending the rotary wing aircraft. In a more specific example, the connector comprises a first and second projection extending from the flame on opposed sides of the center of effort of the rotary wing aircraft for suspending the rotary wing aircraft between a thumb and a finger of an operator.

In an alternate embodiment, the connector comprises a projection located in alignment with the center of effort of the rotary wing aircraft for suspending the rotary wing aircraft. Preferably, a support is connected to the projection for suspending the rotary wing aircraft.

In another embodiment, the invention is incorporated into an integral balance for a rotary wing aircraft. The rotary wing aircraft has a frame extending between a first and a second end with a plurality of driven propellers connected to the frame defining a center of effort of the plurality of driven propellers. The improved integral balance comprises a connector located in proximity to the center of effort of the rotary wing aircraft for suspending the rotary wing aircraft to adjust the center of mass of the rotary wing aircraft in accordance with the center of effort of the plurality of driven propellers.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
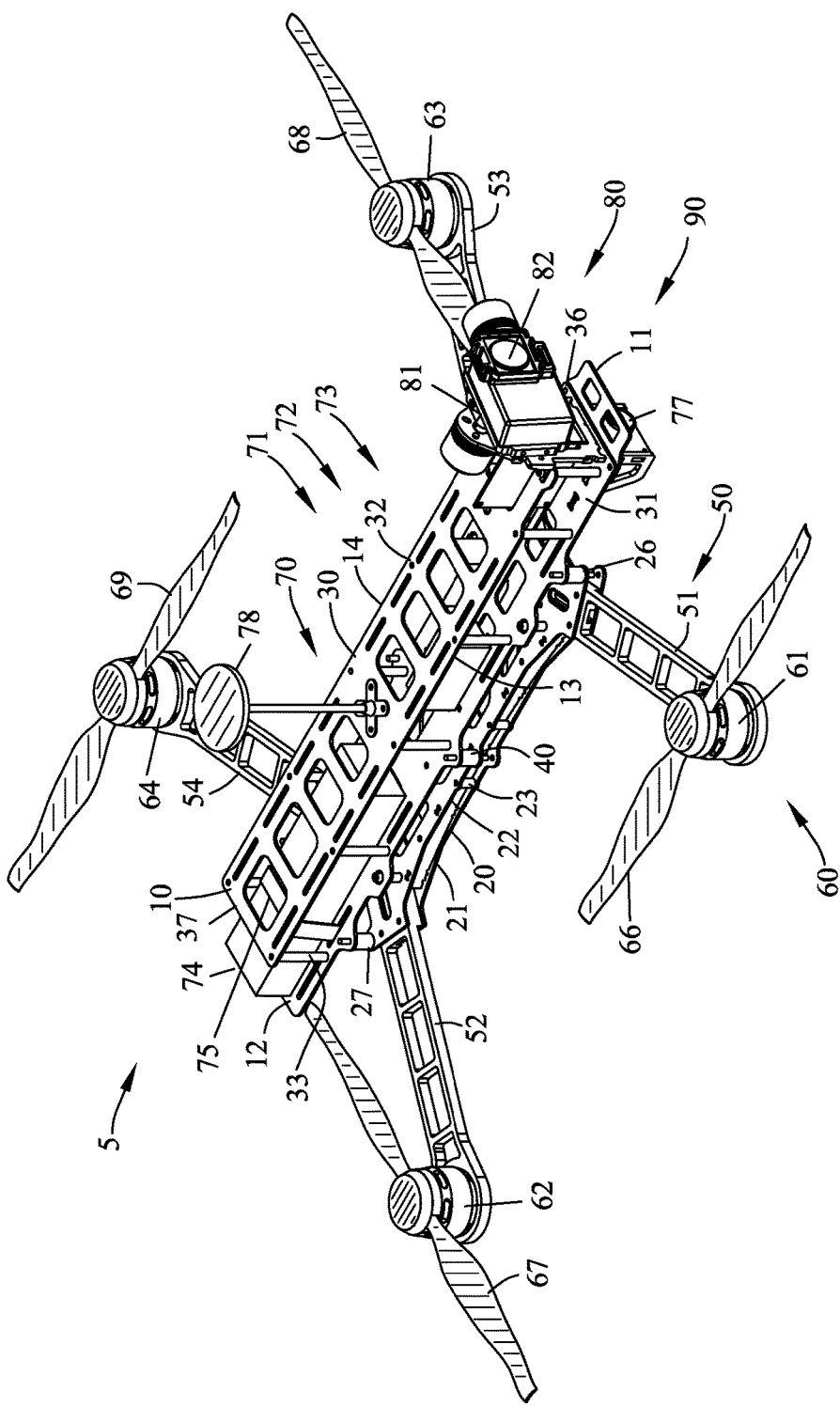
FIG. 1 is an isometric view of a rotary wing aircraft incorporating the improved frame of the present invention.
Figure 2:
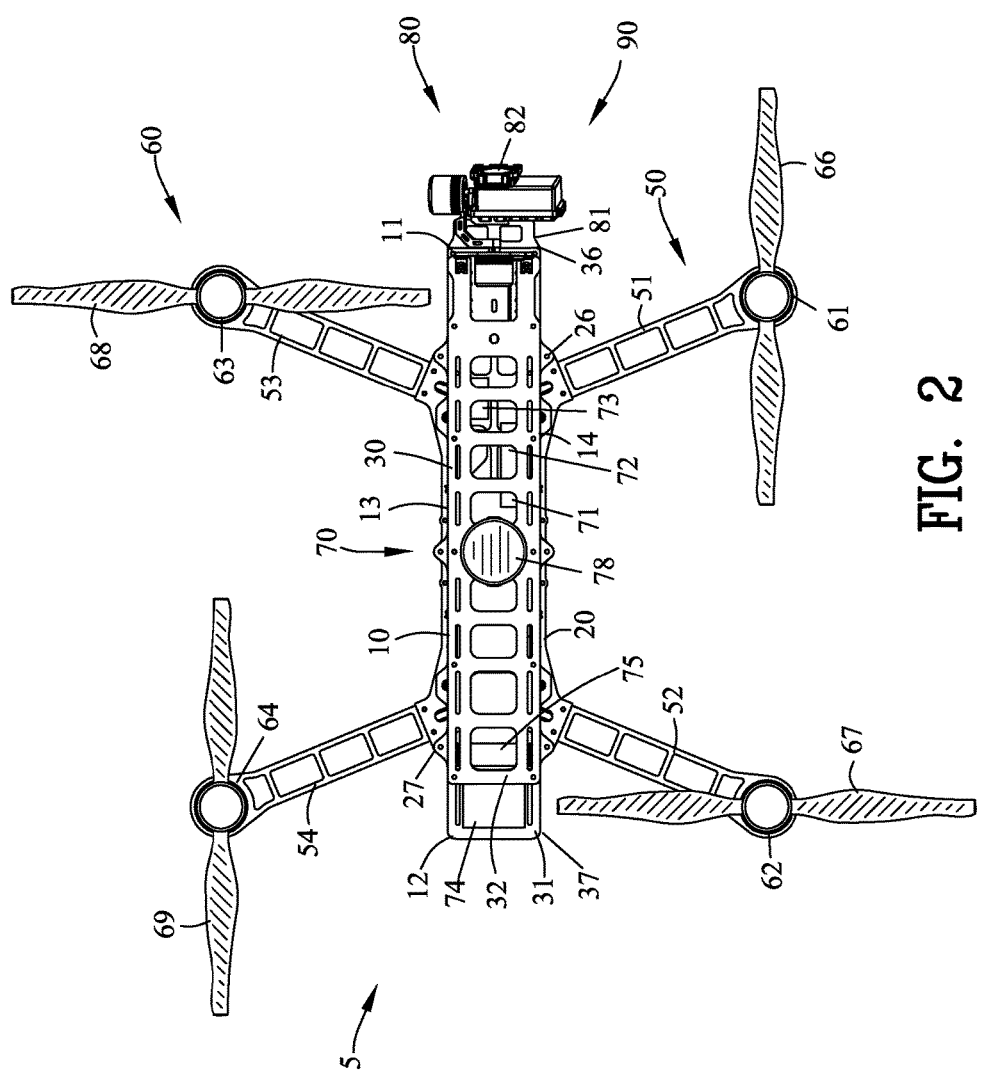
FIG. 2 is a top view of the rotary wing aircraft of FIG. 1.
Figure 3:
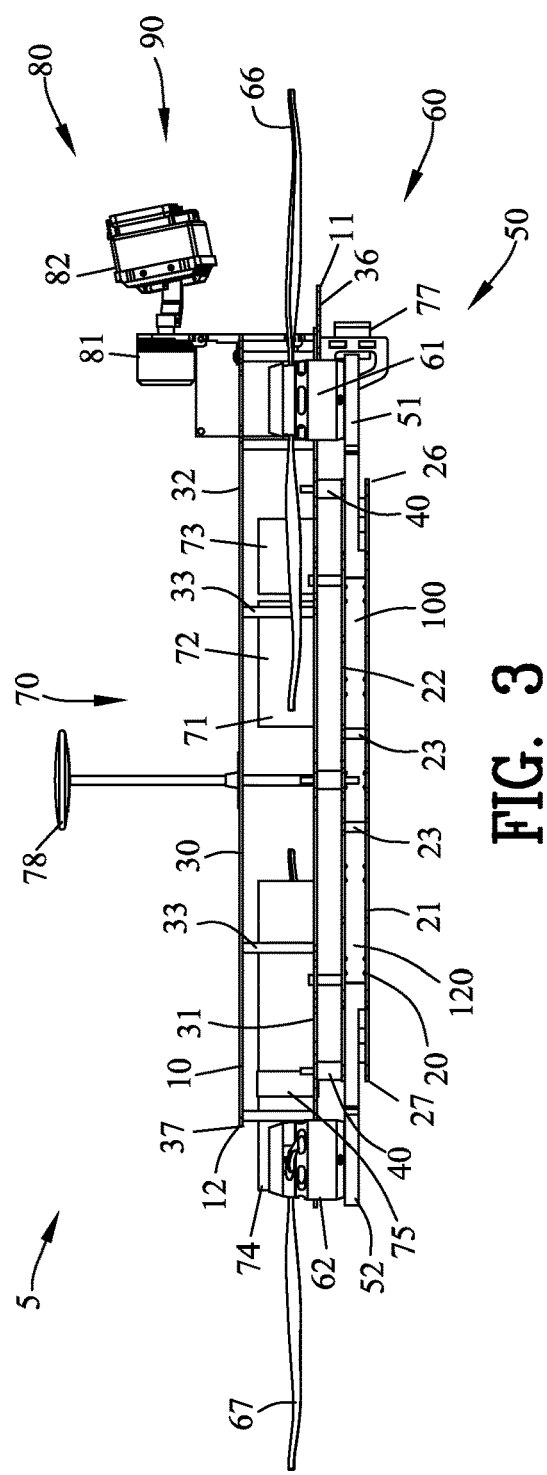
FIG. 3 is a side view of FIG. 2.

FIGS. 1-3 illustrate a rotary wing aircraft 5 shown as an unmanned rotary wing aircraft. Although the rotary wing aircraft 5 has been shown as unmanned rotary wing aircraft, it should be understood that the present invention is applicable to other types of aircraft and land vehicles.

The rotary wing aircraft 5 comprises a frame 10 extending between a first and a second end 1 and 12 bounded by a first and a second edge 13 and 14. The frame comprises a power frame 20 shown as a bottom frame 20 and a carrier frame 30 shown as a top frame. Although the power frame 20 has been shown as a bottom frame and the carrier frame 30 has been shown as a top frame, the arrangement may be reversed with the carrier frame being a bottom frame and the power frame being a top frame.

The power frame 20 includes a power frame lower element 21 and a power frame upper element 22. A plurality of power frame supports 23 interconnect the power frame lower element 21 with the power frame upper element 22 in a substantially parallel relationship. The power frame supports 23 are secured by lower and upper threaded fasteners 28 and 29 to the power frame lower element 21 with the power frame upper element 22. The power frame 20 extends between a first end 26 and a second end 27.

The carrier frame 30 includes a carrier frame lower element 31 and a carrier frame upper element 32. A plurality of carrier frame supports 33 interconnect the carrier frame lower element 31 with the carrier frame upper element 32 in a substantially parallel relationship.

The carrier frame supports 33 are secured by lower and upper threaded fasteners 38 and 39 to the carrier frame lower element 31 with the carrier frame upper element 32. The carrier frame 30 extends between a first end 36 and a second end 37.

A plurality of resilient couplers 40 interconnect the power frame 20 to the carrier frame 30. As will be described in greater detail hereinafter, the plurality of resilient couplers 40 isolate the power frame 20 from the carrier frame 30.

The plurality of arms 50 shown as arms 51-54 extend from the power frame 20 in a pattern commonly referred to as an H frame pattern. Each of the plurality of arms 51-54 are connected to the power frame 20 between the power frame lower element 21 and the power frame upper element 22. Preferably, the plurality of arms 51-54 extend into the power frame 20 between the power frame lower element 21 and a power frame upper element 22 to add structural stability to the plurality of arms 51-54.

A plurality of arms 50 support a plurality of electric motors 60 for driving a plurality of propellers 65. The plurality of arms 51-54 support electric motors 61-64 for driving propellers 66-69. The plurality of electric motors 61-64 are individually controlled through electrical conductors (not shown) as should be well known to those skilled in the art.

In the embodiment, the carrier frame 30 including the carrier frame lower element 31 and the carrier frame upper element 32 extend beyond the longitudinal length of the power frame 20. The carrier frame 30 is adapted to receive a variety of electronic components and other accessories to enabling remote flight, remote sensing and/or remote delivery of items.

The plurality of resilient couplers 40 isolate vibration generated by the plurality of electric motors 61-64 driving propellers 65-69 present in the power frame 20 from the electronic components, accessories and/or items present in the carrier frame 30. The reduction of vibration within the carrier frame 30 provides for enhanced operation of the electronic components, accessories and/or payloads in or on the carrier frame 30.

Preferably, flight electronic components 70 enabling remote flight are mounted between the carrier frame lower element 31 and the carrier frame upper element 32. In the example, flight electronics components 70 including an electronic flight control 71 and a transceiver 72 and an optional GPS system 73 are mounted between the carrier frame lower element 31 and the carrier frame upper element 32. A battery 74 is adjustably mounted between the carrier frame lower element 31 and the carrier frame upper element 32. The battery 74 is secured within the carrier frame 20 by suitable means such as a tension strap 75 and the like.

A flight camera 77 is mounted to the carrier frame lower element 31 at the first end 1 of the frame 10 for showing the actual flight direction and attitude of the rotary wing aircraft 5. The flight camera 77 enables an operator to visually determine the flight direction and attitude to remotely fly the rotary wing aircraft 5. An antenna array 78 is mounted upon the carrier frame upper element 32. The antenna array 78 is connected to the electronic flight control 71 and the transceiver 72 and the optional GPS system 73 and the flight camera 77 for communication with a remote operator station (not shown) for flying the rotary wing aircraft 5 and for exchanging information between the rotary wing aircraft 5 and the remote operator station (not shown).

An accessory 80 may be mounted within or external the carrier frame 30. In the example, the accessory 80 is shown as a gimbal 81 supporting a high definition camera 82. mounted to the front of the carrier frame 30. In the alternative, the accessory 80 may include a sensor for sensing conditions about the rotary wing aircraft 5. Examples of such sensors include but not limited to weather sensors, gas sensors, radiation sensors, audio sensors, motion sensors and the like. The accessory 80 is connected to the transceiver 72 and the antenna array 78 for exchanging data from the accessory 80 to the remote operator station (not shown).

FIGS. 4-7 illustrate the installation of an accessory frame 150 onto the first end 11 of the rotary wing aircraft 5. The accessory frame 150 comprises a first and a second accessory frame 151 and 152. The second accessory frame 152 is secured to the first accessory frame 151 and perpendicular thereto. The first accessory frame 151 is adapted to receive an accessory load 155.

Figure 4:
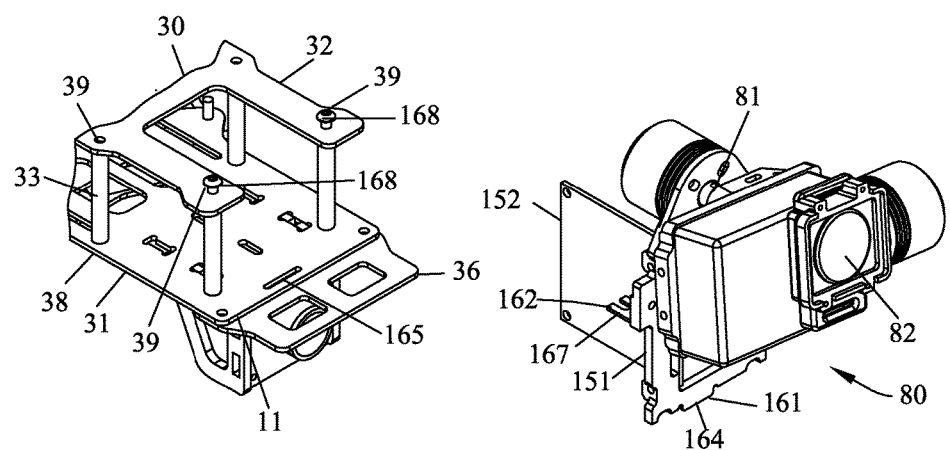
FIG. 4 is a view similar to FIG. 1 illustrating an accessory frame positioned for mounting to the rotary wing aircraft.
Figure 5:
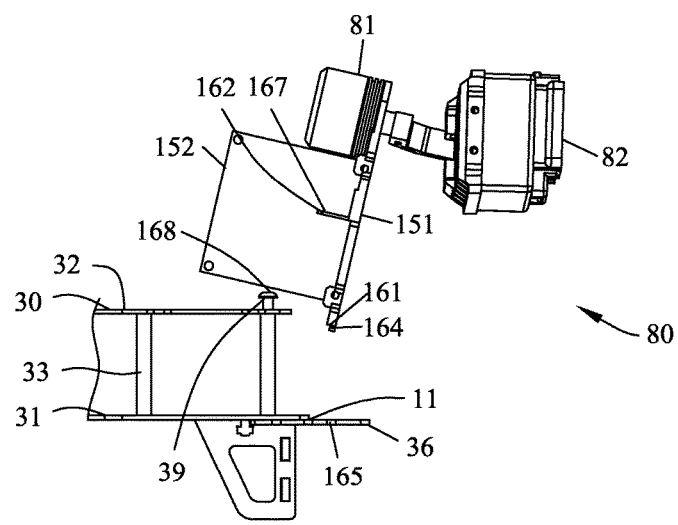
FIG. 5 is a side view illustrating an accessory frame positioned for mounting to the rotary wing aircraft.

FIGS. 4 and 5 illustrate the accessory load 155 as the gimbal 81 supporting a high definition camera 82. The first accessory frame 151 is shown as a planar board for mounting the gimbal 81 by conventional means. The second accessory frame 152 is shown as a planar board perpendicularly mounted to the first accessory frame 151 by conventional means.

A quick change mounting 160 removably mounts the accessory frame 150 to the first end 36 of the carrier frame 30. The quick change mounting 160 includes a first mounting 161 and a second mounting 162 for removably securing the accessory frame to a frame lower element 31 and a frame upper element 32 of the carrier frame 30. In this embodiment, the first mounting 161 includes a projection 164 extending from the first accessory frame 151 of the accessory frame 150 for insertion into an aperture 165 defined into the frame lower element 31 of the carrier frame 30.

The second mounting 162 includes plural tabs 167 (only one shown) extending from the first accessory frame 151 of the accessory frame 150 for securing to the frame upper element 32 of the carrier frame 30. The carrier frame supports 33 interconnect the frame lower element 31 to the frame upper element 32. Two upper threaded fasteners 168 of the upper threaded fastener 39 are loosened for enabling the insertion of the tabs 167.

Figure 6:
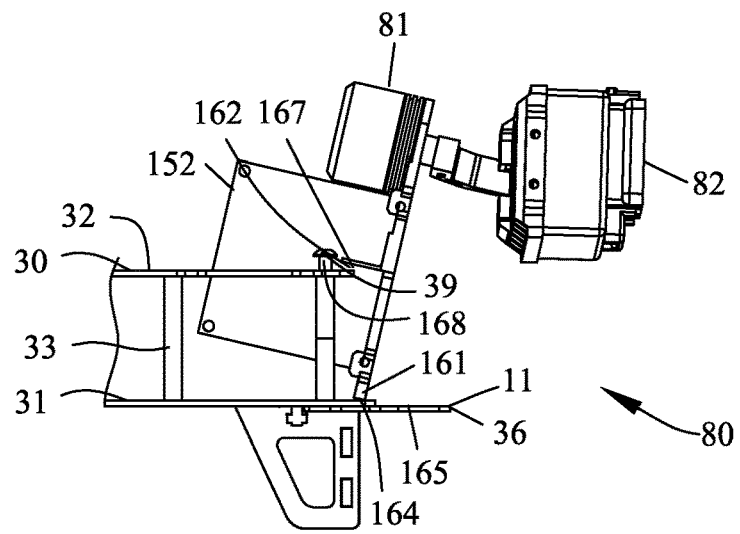
FIG. 6 is a side view similar to FIG. 5 illustrating the insertion of a projection extending from the accessory frame for into an aperture defined into a frame lower element.

FIG. 6 illustrates the projection 164 extending from the first accessory frame 151 of the accessory frame 150 being inserted into the aperture 165 defined into the frame lower element 31 of the carrier frame 30.

Figure 7:
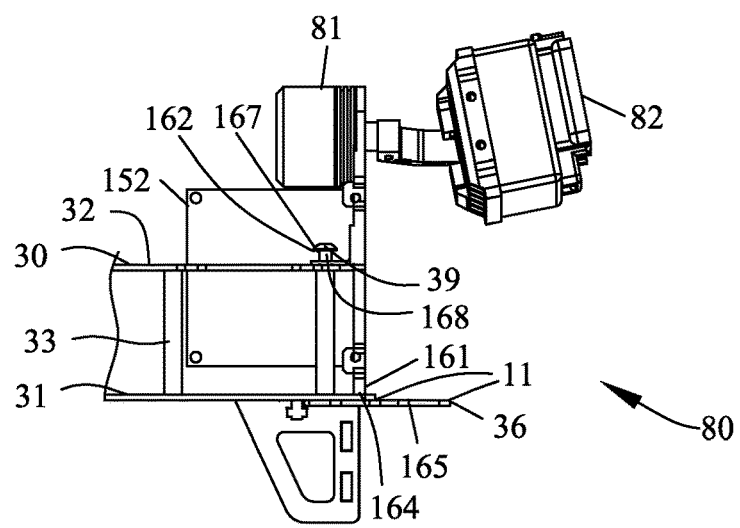
FIG. 7 is a side view similar to FIG. 6 illustrating a tab extending from the accessory frame for securing to the frame upper element.

FIG. 7 illustrates the rotation of the accessory frame 150 about the projection 164 for positioning the tabs 167 extending from the first accessory frame 151 of the accessory frame 150 adjacent to the carrier frame supports 33 located at the first end 36 of the carrier frame 30. The two upper threaded fasteners 168 of the upper threaded fastener 39 are tightened to secure the plural tabs 167 to the frame upper element 32. The accessory frame 150 may be quickly removed by loosening the two upper threaded fasteners 168 and rotating the accessory frame 150 about the projection 164 and removing the projection 164 from the aperture 165.

The addition of the accessory frame 150 including the accessory 80 to the first end 36 of the carrier frame 30 changes the center of mass (M) of the rotary wing aircraft 5. As best shown in FIGS. 1-3, the battery 74 is movable relative to the second end 37 of the carrier frame 30 for compensating for different weights of the accessory load 151 secured to the accessory frame 150. The battery 74 is movable longitudinally along the second end 37 of the carrier frame 30 for returning the center of mass (M) of the rotary wing aircraft 5 to the proper location to insure proper flight characteristics of the rotary wing aircraft 5. Once the battery 74 is properly positioned for counterbalancing the accessory load 151 secured to the accessory frame 150, the position of the battery 74 is secured by the strap 75.

Figure 8:
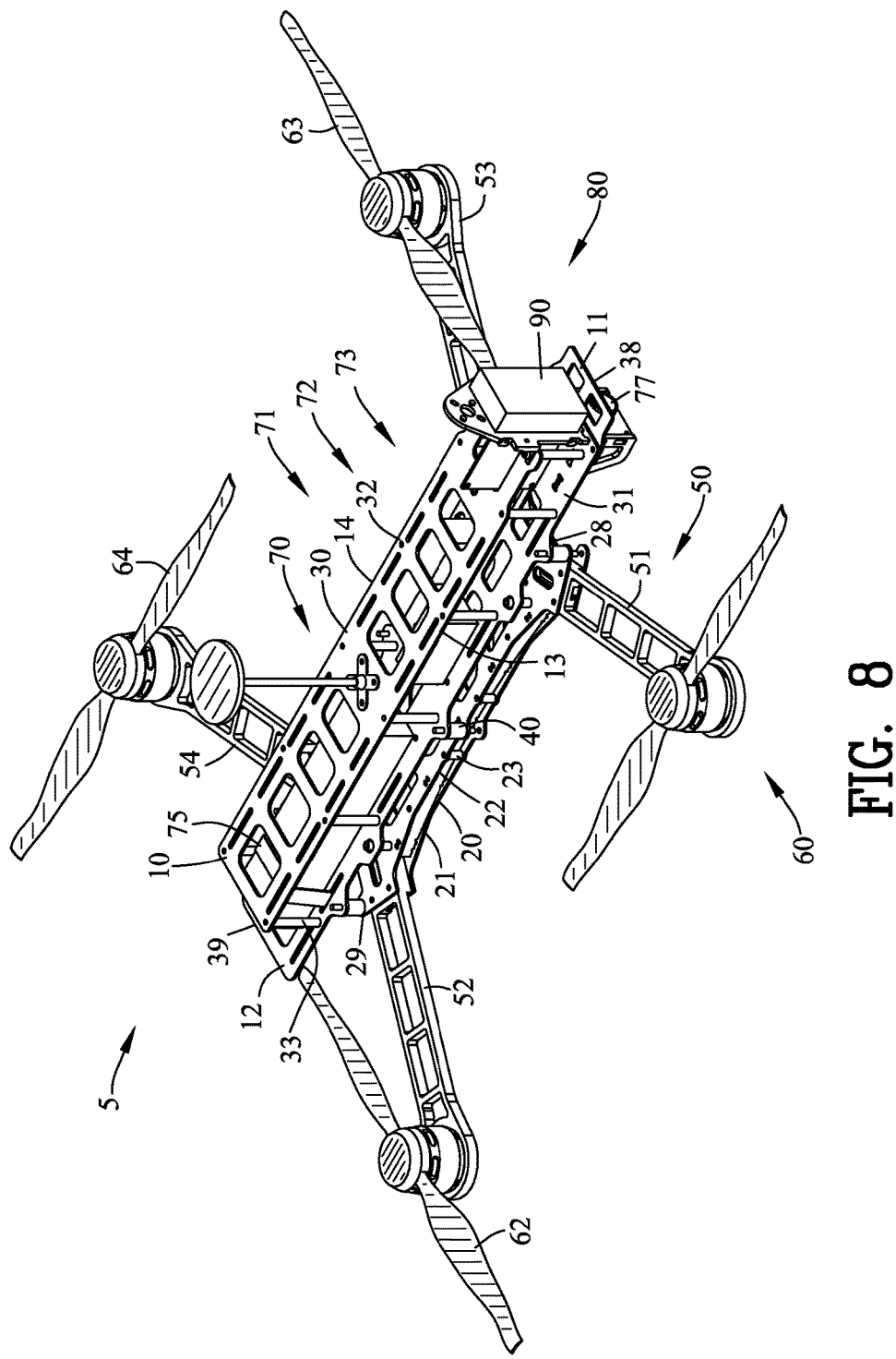
FIG. 8 is a view similar to FIG. 1 illustrating an accessory frame positioned for mounting to the rotary wing aircraft.

The accessory frame 150 may support a variety of accessory loads such as sensors and/or devices including but not limited to optical sensors, video sensors, electromagnetic radiation sensors, magnetic sensors, heat sensors, chemical sensors, gas sensors, particulate sensors audio sensors, motion sensors and the like, FIG. 8 is a view similar to FIG. 1 illustrating a delivery payload secured to the first end 36 of the the carrier frame 30. The delivery payload 90 may include payloads to be delivered to a remote location by the rotary wing aircraft 5. The delivery payload 90 may be delivered by landing the rotary wing aircraft 5 at a remote location or by remotely releasing the delivery payload 90 from the flying rotary wing aircraft 5. It should be appreciated by those skilled in the art that the delivery payload 90 may include a variety of items too numerous to mention.

Figure 9:
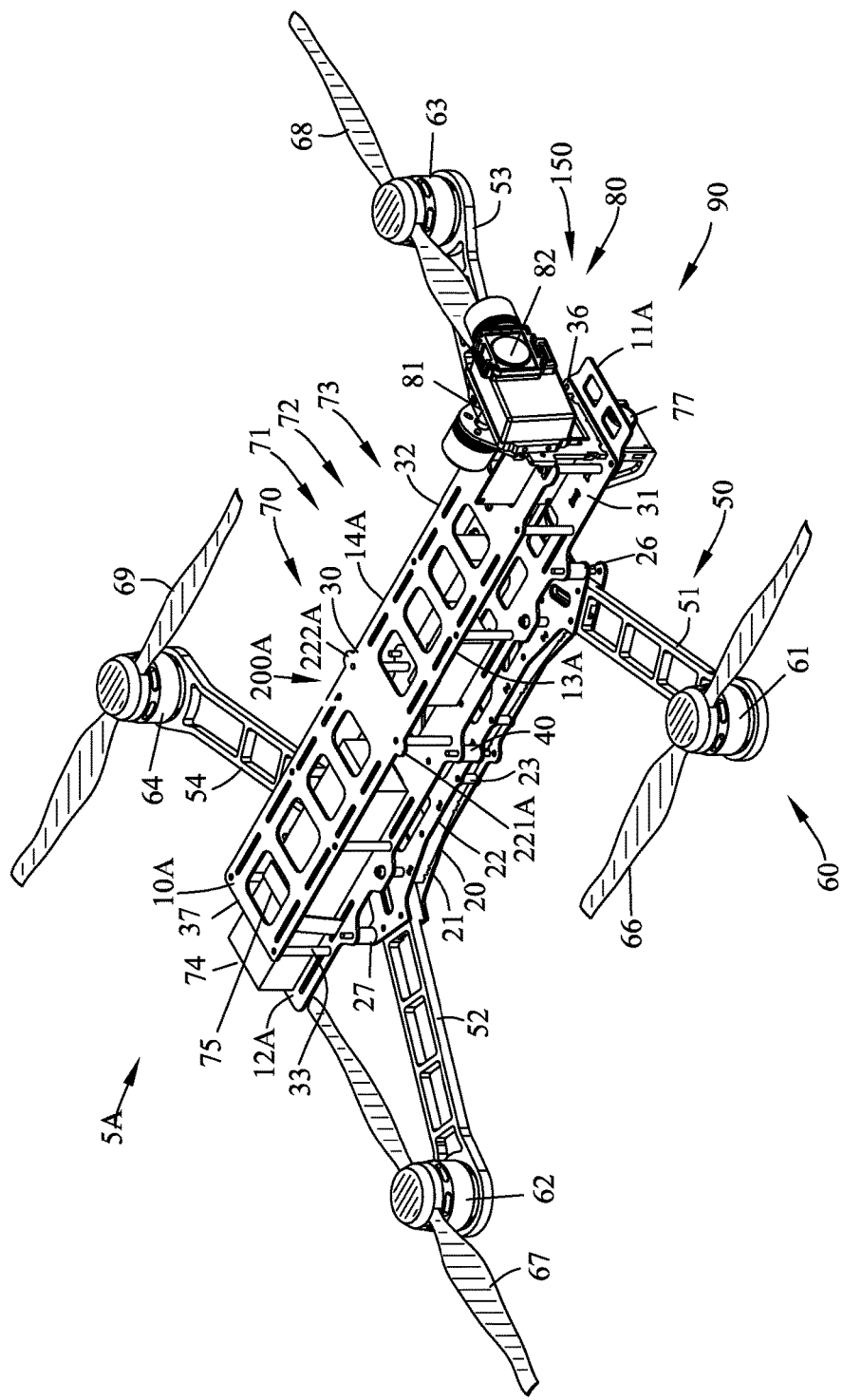
FIG. 9 is an isometric view of a second embodiment of the invention of a rotary wing aircraft incorporating an integral balance.
Figure 10:
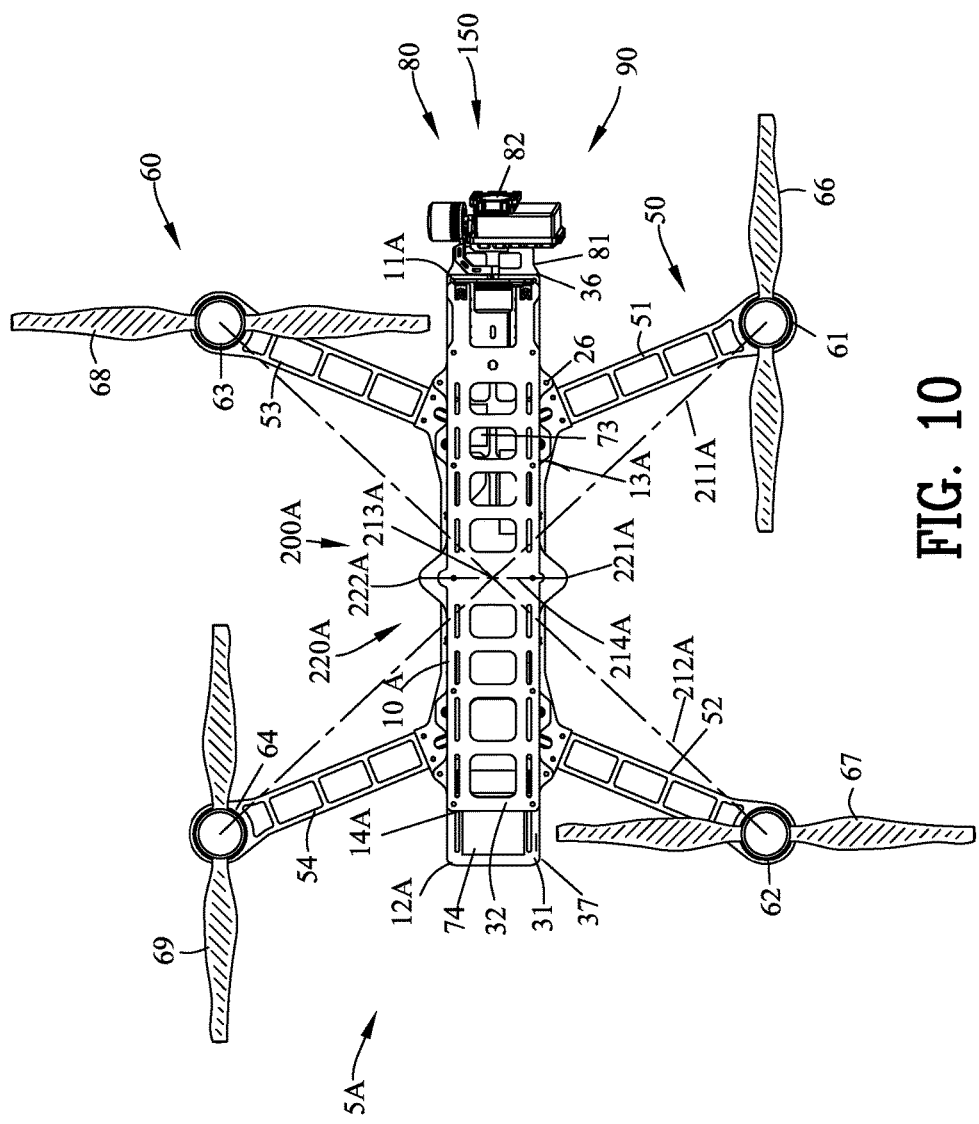
FIG. 10 is a top view of the rotary wing aircraft of FIG. 9.
Figure 11:
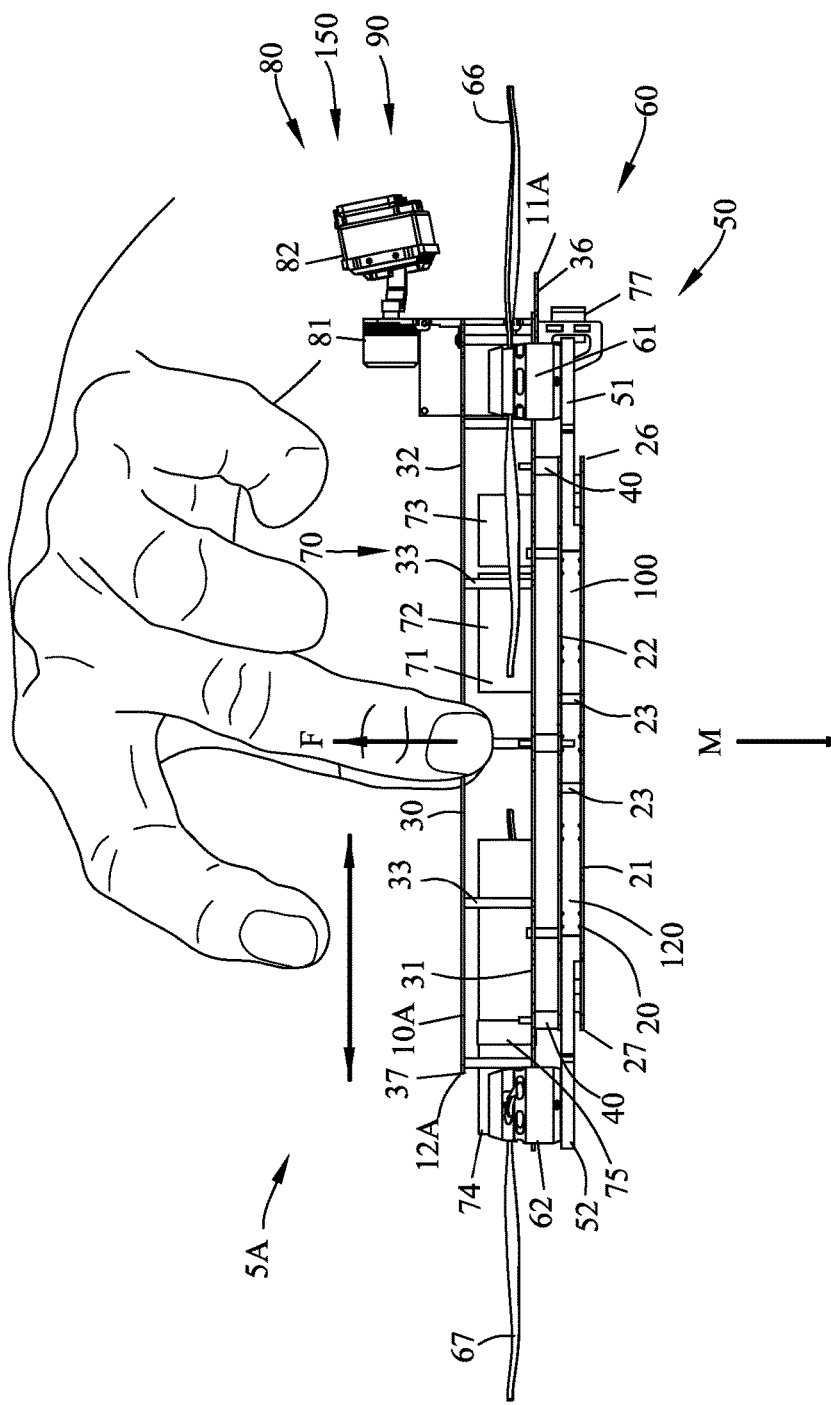
FIG. 11 is a side view of rotary wing aircraft being suspended between a thumb and a finger of an operator.

FIGS. 9-11 are various views a second embodiment of the invention of a rotary wing aircraft 5A incorporating an integral balance 200A. Similar parts are labeled with similar numerals with new parts being followed by an A.

The rotary wing aircraft 5A includes a frame 10A extending between a first and a second end 11A and 12A of the rotary wing aircraft 5A. The frame 10A defines opposed first and second edges 13A and 14A.

A previously set forth herein, the center of mass (M) of the rotary wing aircraft 5A was changed by moving a component slidably connected to the frame 10A. A movable battery 74 disposed proximate the second end 12A of the frame 10A was set forth as an example of the component slidably connected to the frame 10A. The movement of the center of mass (M) was required to compensate for the addition of the accessory frame 150 including the accessory 80.

FIG. 10 is a top view of the rotary wing aircraft 5A of FIG. 9 illustrating the plurality of driven propellers 65 connected to the frame 10A by the plurality of arms 50. The plurality of arms 51-54 support the plurality of driven propellers 65 comprising propellers 66-69.

The rotation of the plurality of driven propellers 65 defining a center of effort or force (F) of the plurality of driven propellers 65 for lifting rotary wing aircraft 5A.

A first construction line 211A interconnects driven propellers 61 and 64. A second construction line 212A interconnects driven propellers 62 and 63. The center of effort or force (F) of the plurality of driven propellers 65 is located at the intersection 213A of the first and second construction lines 211A and 212A. The center of effort or force (F) of the plurality of driven propellers 65 is located within the frame 10A between the opposed first and second edges 13A and 14A.

The integral balance 200A comprises a connector 220A located in proximity to a center of effort or force (F) coincident with the intersection 213A of the first and second construction lines 211A and 212A.

In this embodiment, the connector 220A comprises a first and a second projection 221A and 222A extending from opposed edges 13A and 14A of the frame 10A. Preferably, the first and second projections 221A and 222A are unitary with the frame 10A. The first and second projections 221A and 222A are located on opposed sides of the center of effort or force (F) defined by the intersection 213A of the construction lines 211A and 212A. A construction line 214C extends perpendicular to the first and second ends 11A and 12A of the frame 10A and intersects the center of effort or force (F) and the first and second projections 221A and 222A.

FIG. 11 is a side view of rotary wing aircraft 5A being suspended from the center of effort or force (F) of the plurality of driven propellers 65 for adjusting the center of mass (M) of the rotary wing aircraft 5A to be in alignment with the center of effort or force (F) of the plurality of driven propellers 65. The rotary wing aircraft 5A is suspended between a thumb and a finger of an operator. Preferably, the rotary wing aircraft 5A is supported between the index finger and the thumb of an operator. The suspension of the rotary wing aircraft 5A by the first and second projections 221A and 222A acts as a balance between the first and second ends 11A and 12A of the frame 10A. The component such as the battery 74 is adjusted until the rotary wing aircraft 5A is in a horizontal position to insure the center of effort or force (F) is aligned with the center of mass (M). When the rotary wing aircraft 5A is supported between the index finger and the thumb of one hand of the operator, the second hand of the operator is free to adjust the battery 74.

The integral balance 200 provides a quick and efficient apparatus and method for adjusting the center of mass (M) after a change in the accessory fame 150 and/or the accessory 80. Since the balance 200A is integral with the frame 10A, the adjustment of the center of mass (M) may be rapidly accomplished in the field.

Figure 12:
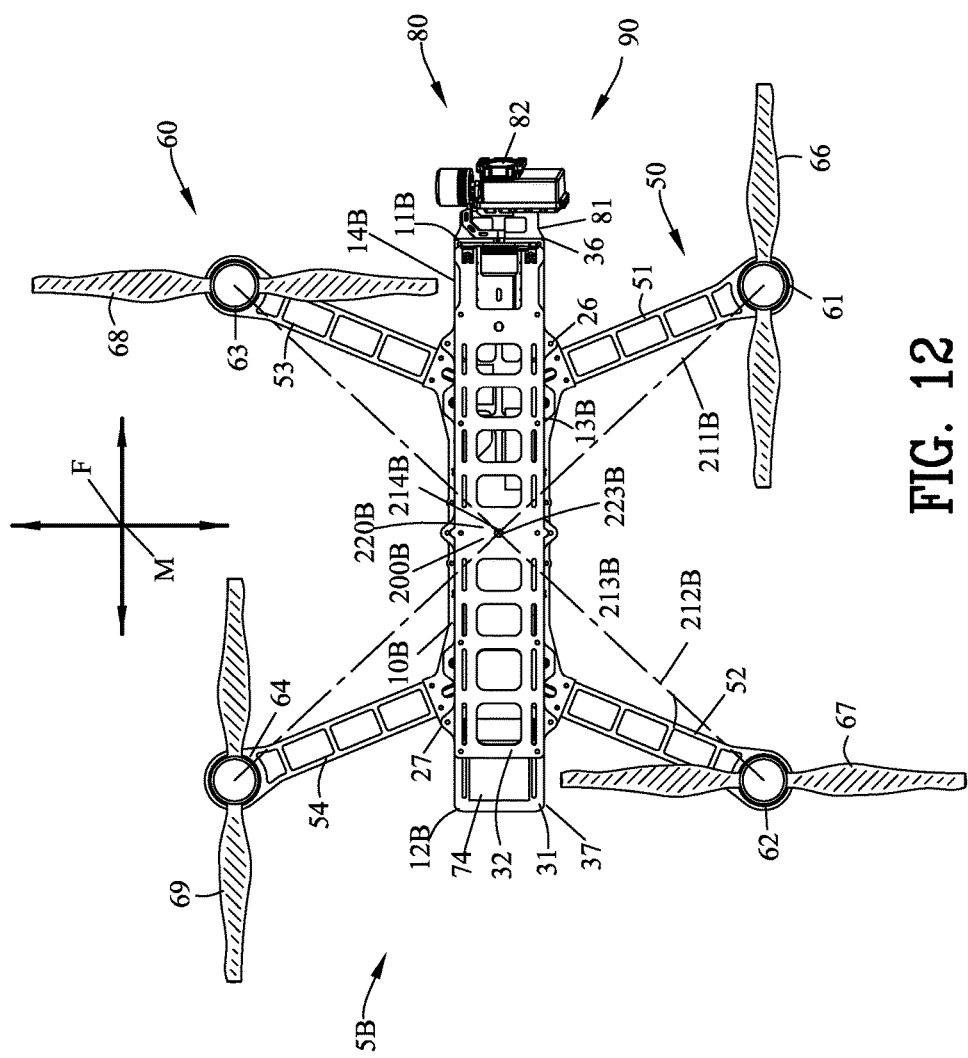
FIG. 12 is a top view of a third embodiment of the invention of a rotary wing aircraft incorporating an integral balance.
Figure 13:
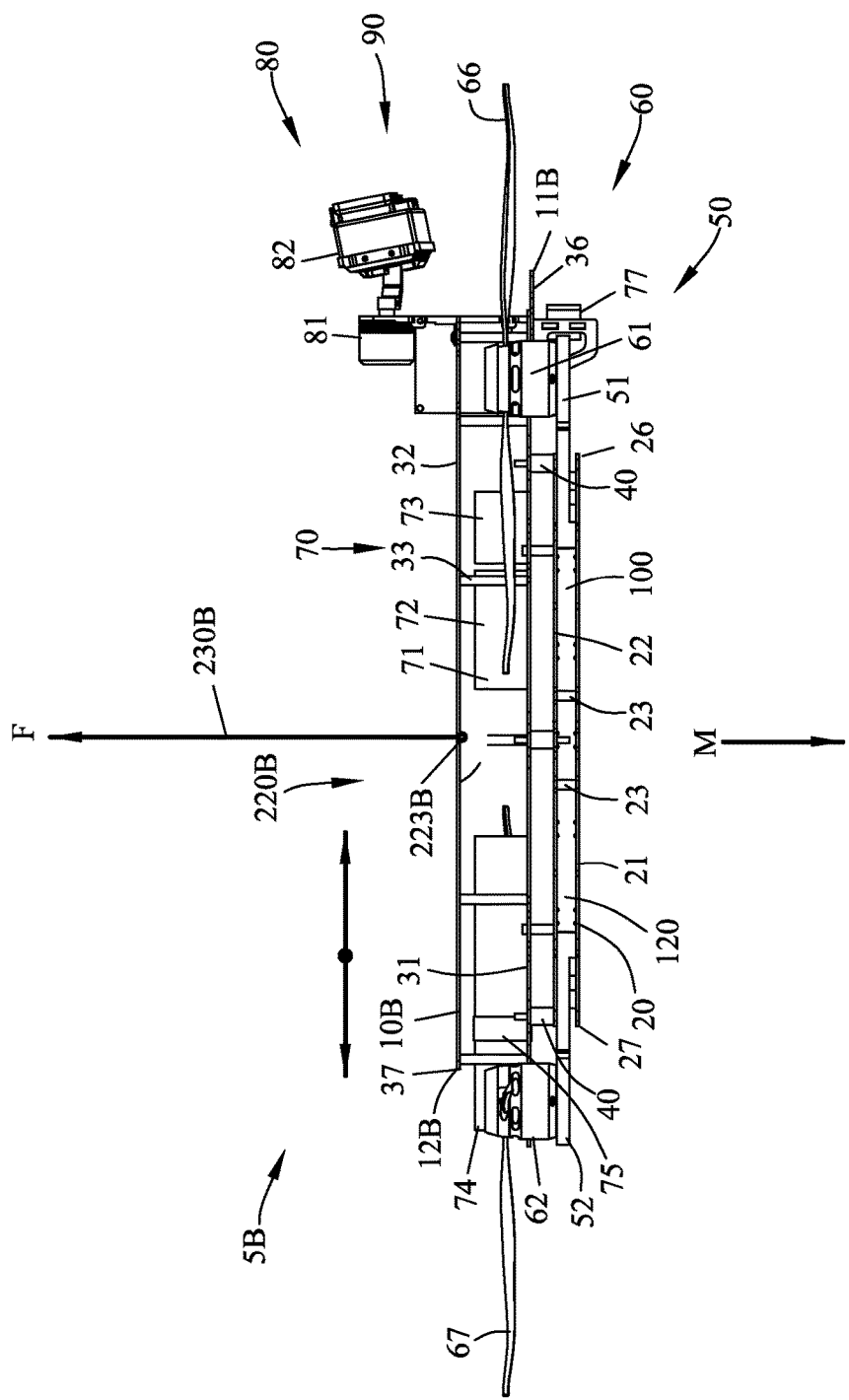
FIG. 13 is a side view of rotary wing aircraft of FIG. 12 being suspended by a support.

FIGS. 12 and 13 illustrate a third embodiment of the invention of a rotary wing aircraft 5B incorporating an integral balance 200B. Similar parts are labeled with similar numerals with new parts being followed by a B. In this embodiment, the integral balance 200B comprises a connector 220B extending between opposed edges 13B and 14B of the frame 10B. Preferably, the connector 220B is unitary with the frame 10B. An aperture 223B is located at the center of effort or force (F) defined by the intersection 213B of the construction lines 211B and 212B.

FIG. 13 illustrates the third embodiment of the invention being suspended by a support 230B. Preferably, the support 230B is flexible support shown as a string fixed to the aperture 223B. The suspension of the rotary wing aircraft 5B by the support 230B acts as a balance between the first and second ends 11B and 12B of the frame 10B. The component such as the battery 74 is adjusted until the rotary wing aircraft 58B is in a horizontal position to insure the center of effort or force (F) is aligned with the center of mass (M).

In addition, the support 230B acts as a balance between the first and second edges 13B and 14B of the frame 10B. The third embodiment of the invention provides location of the center of mass (M) of the rotary wing aircraft 5B in two dimensions as shown by the cross arrows in FIG. 12 in contrast to the single dimension of the second embodiment of the invention shown in FIGS. 9-11.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved accessory mounting for a rotary wing aircraft, comprising:
   a frame including a power frame and a carrier frame interconnected in a substantially parallel relationship;
   said power frame extending between a first and a second power frame end;
   said carrier frame extending between a first and a second carrier frame end;
   a plurality of driven propellers connected to said power frame;
   an electronic flight control for controlling said plurality of driven propellers for directing the flight of the rotary wing aircraft;
   an accessory frame for receiving an accessory load to be carried by the rotary wing aircraft;
   a quick change mounting for removably mounting said accessory frame to said first end of said carrier frame;
   a battery disposed in proximity to said second end of said power frame and said second end of said carrier frame for powering the rotary wing aircraft;
   said battery being movable relative to said second end of said power frame and said second end of said carrier frame between said power frame and said carrier frame for compensating for different weights of said accessory load secured to said accessory frame; and
   a fix for securing said battery to said frame.

2. The improved accessory mounting for a rotary wing aircraft as set forth in claim 1, wherein said carrier frame includes a carrier frame lower element and a carrier frame upper element; and
   said quick change mounting includes a first and a second mounting for removably securing said accessory frame to said carrier frame lower element and said carrier frame upper element.

3. The improved accessory mounting for a rotary wing aircraft as set forth in claim 1, wherein said carrier frame includes a carrier frame lower element and a carrier frame upper element;
   said quick change mounting includes a first and a second mounting for removably securing said accessory frame to said carrier frame lower element and said carrier frame upper element of said frame;
   said first mounting including a projection extending from said accessory frame for insertion into an aperture defined into said carrier frame lower element; and
   said second mounting including a tab extending from said accessory frame for securing to said carrier frame upper element by a fastener.

4. The improved accessory mounting for a rotary wing aircraft as set forth in claim 1, wherein said carrier frame includes a carrier frame lower element and a carrier frame upper element;
   a plurality of supports interconnecting said carrier frame lower element and said carrier frame upper element and secured by fasteners;
   said first mounting including a projection extending from said accessory frame for insertion into an aperture defined into said carrier frame lower element; and
   said second mounting including a tab extending from said accessory frame for securing to said carrier frame upper element by a tab fasteners.

5. The improved accessory mounting for a rotary wing aircraft as set forth in claim 1, wherein said accessory load comprises a sensor for sensing regions about the rotary wing aircraft.

6. The improved accessory mounting for a rotary wing aircraft as set forth in claim 1, wherein said accessory load comprises a sensor for sensing regions about the rotary wing aircraft; and
   said sensor may including at least one of an optical sensor, a video sensor, an electromagnetic radiation sensor, a magnetic sensor, a heat sensor, a chemical sensor, a gas sensor, a particulate sensor, audio sensors and motion sensors.

7. The improved accessory mounting for a rotary wing aircraft, comprising:
a frame;
a plurality of driven propellers connected to said frame;
an electronic flight control for controlling said plurality of driven propellers for directing the flight of the rotary wing aircraft;
an accessory frame located proximate a first end of said frame for receiving an accessory load to be carried by the rotary wing aircraft;
a battery disposed proximate a second end of said frame for powering the rotary wing aircraft;
a quick change mounting for removably mounting said accessory frame to said frame;
said battery being movable relative to said second end of said frame for compensating for different weights of said accessory load secured to said accessory frame;
a strap for securing said battery to said frame;
said quick change mounting includes a first and a second mounting for removably securing said accessory frame to a frame lower element and a frame upper element of said frame;
said first mounting including a projection engaging with an aperture between said accessory frame and said frame lower element; and
said second mounting including a tab engaging with a fastener between said accessory frame and said frame upper element.

8. An improved frame for a rotary wing aircraft, comprising:
a power frame;
a plurality of arms extending from said power frame for mounting a plurality of driven propeller;
a carrier frame having a carrier frame lower element and a carrier frame upper element;
a plurality of resilient couplings connecting said carrier frame to said power frame with said plurality of resilient couplings inhibiting transmission of vibrations from said power frame to said carrier frame;
an electronic flight control for controlling said plurality of driven propellers of the rotary wing aircraft for directing the flight of the rotary wing aircraft;
an accessory frame for receiving an accessory load to be carried by the rotary wing aircraft;
a quick change mounting comprising a first and a second mounting for removably securing said accessory frame to a first end of said carrier frame lower element and a first end of said carrier frame upper element;
a battery disposed in proximity to a second end of said carrier frame for powering the rotary wing aircraft;
said battery being movable between said power frame and said carrier frame relative to said second end of said carrier frame for compensating for different weights of said accessory load secured to said accessory frame; and
a fix for securing said battery to said power frame.

9. An improved accessory mounting for a rotary wing aircraft, comprising:
a frame including a power frame and a carrier frame interconnected in a substantially parallel relationship;
a plurality of driven propellers connected to said power frame;
an electronic flight control for controlling said plurality of driven propellers for directing the flight of the rotary wing aircraft;
an accessory frame located in proximity to a first end of said carrier frame for receiving an accessory load to be carried by the rotary wing aircraft;
a battery disposed in proximity to a second end of said carrier frame for powering the rotary wing aircraft; and
said battery being slidable between said power frame and said carrier frame relative to said second end of said carrier frame for compensating for different weights of said accessory load secured to said accessory frame.

* * * * *